(12) United States Patent
Courtney

(10) Patent No.: US 10,712,124 B2
(45) Date of Patent: Jul. 14, 2020

(54) RETENTION CLIP

(71) Applicant: Justin Courtney, Sapulpa, OK (US)

(72) Inventor: Justin Courtney, Sapulpa, OK (US)

(73) Assignee: TULSTER, LLC, Jenks, OK (US)

( * ) Notice: Subject to any disclaimer, the term of this patent is extended or adjusted under 35 U.S.C. 154(b) by 0 days.

(21) Appl. No.: 16/102,671

(22) Filed: Aug. 13, 2018

(65) Prior Publication Data

US 2019/0049214 A1 Feb. 14, 2019

Related U.S. Application Data

(60) Provisional application No. 62/544,668, filed on Aug. 11, 2017.

(51) Int. Cl.
| | | |
|---|---|---|
| *F41C 33/04* | (2006.01) | |
| *F41C 33/00* | (2006.01) | |
| *A45F 5/02* | (2006.01) | |
| *F16M 11/04* | (2006.01) | |
| *F16M 13/04* | (2006.01) | |

(52) U.S. Cl.
CPC .............. *F41C 33/006* (2013.01); *A45F 5/02* (2013.01); *A45F 5/021* (2013.01); *F16M 11/04* (2013.01); *F41C 33/04* (2013.01); *A45F 2200/0575* (2013.01); *A45F 2200/0591* (2013.01); *F16M 13/04* (2013.01)

(58) Field of Classification Search
CPC .............. F41C 33/0209; F41C 33/0218; F41C 33/0227; F41C 33/0236; F41C 33/0245; F41C 33/0254; F41C 33/0263; F41C 33/0272; F41C 33/0281; F41C 33/02; F41C 33/04; A45F 5/02; A45F 5/021

USPC ................... 224/242, 245, 914, 931
See application file for complete search history.

(56) References Cited

U.S. PATENT DOCUMENTS

| | | | | |
|---|---|---|---|---|
| 491,814 | A * | 2/1893 | Richards | F16B 39/12 411/223 |
| 1,756,677 | A * | 4/1930 | Cook | F42B 39/02 224/245 |
| 2,051,844 | A * | 8/1936 | Green | F41C 33/0209 224/243 |
| 2,783,536 | A * | 3/1957 | McQueary | B26B 29/025 30/151 |
| 2,987,169 | A * | 6/1961 | Hinchcliffe | B65G 15/42 198/699 |
| 5,518,155 | A * | 5/1996 | Gallagher | F41C 33/0209 224/242 |
| 5,931,358 | A * | 8/1999 | Rogers | F41C 33/02 224/243 |
| 5,944,239 | A * | 8/1999 | Rogers | F41C 33/0209 224/193 |
| 7,694,860 | B2 * | 4/2010 | Clifton, Jr. | F41A 17/00 224/198 |

(Continued)

*Primary Examiner* — Justin M Larson
(74) *Attorney, Agent, or Firm* — Scott R. Zingerman

(57) ABSTRACT

A retainer clip including a body having a first end, second end, top, bottom, first side and second side. An arm extends from the body at a junction on the second end of the body. The arm is preferably folded so as to extend along the bottom of the body such that the arm is spaced from the body. The body includes an aperture which extends through the body from the top to the bottom. A stop pin is positioned in the aperture and is capable of extending into the space between the bottom of the body and the arm.

19 Claims, 4 Drawing Sheets

(56) References Cited

U.S. PATENT DOCUMENTS

| | | | | |
|---|---|---|---|---|
| 8,016,532 | B2* | 9/2011 | Park | F16B 39/12 411/251 |
| 9,322,612 | B2* | 4/2016 | Clifton, Jr. | F41C 33/0263 |
| 10,066,902 | B2* | 9/2018 | Gregory | F41C 33/0209 |
| 10,274,296 | B2* | 4/2019 | Tedder | F42B 39/02 |
| 10,317,169 | B2* | 6/2019 | McKendrick | F41C 33/0209 |
| 2002/0153394 | A1* | 10/2002 | Borson | A45F 5/00 224/183 |
| 2010/0272539 | A1* | 10/2010 | Park | F16B 37/12 411/438 |
| 2019/0049214 | A1* | 2/2019 | Courtney | F41C 33/006 |

* cited by examiner

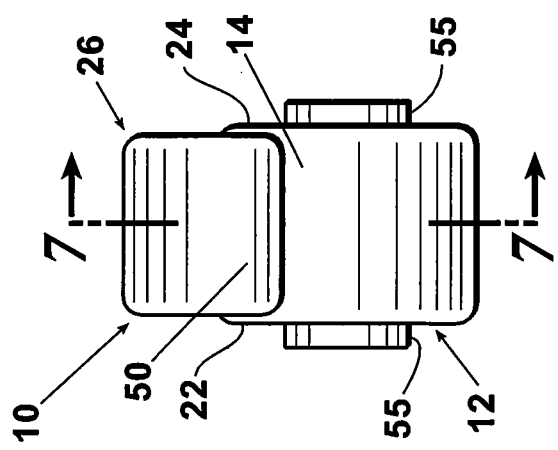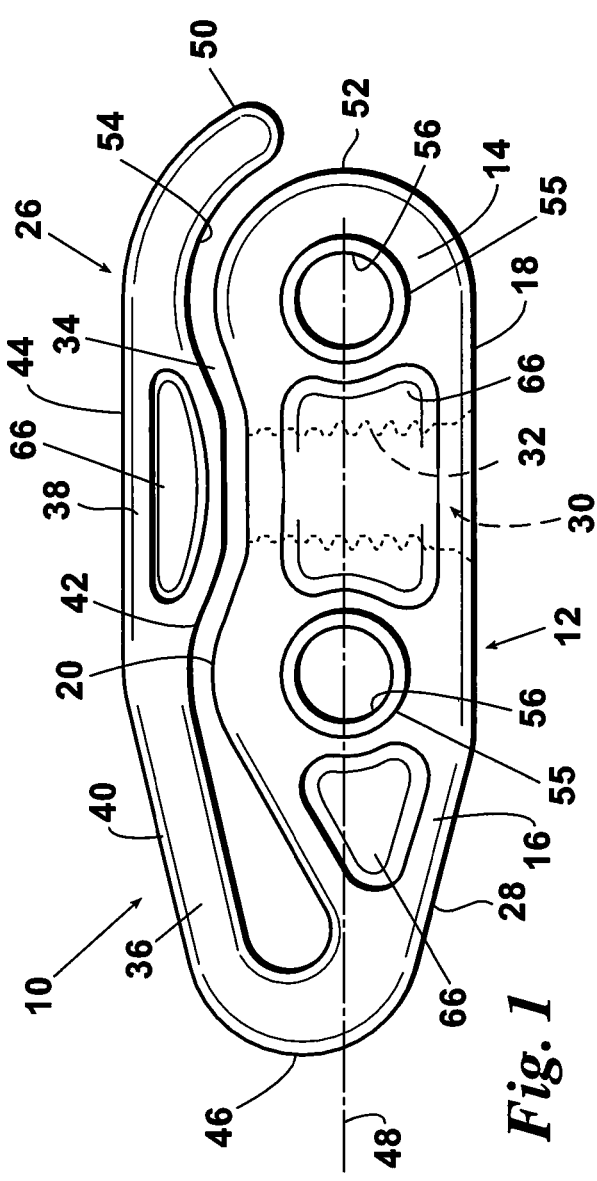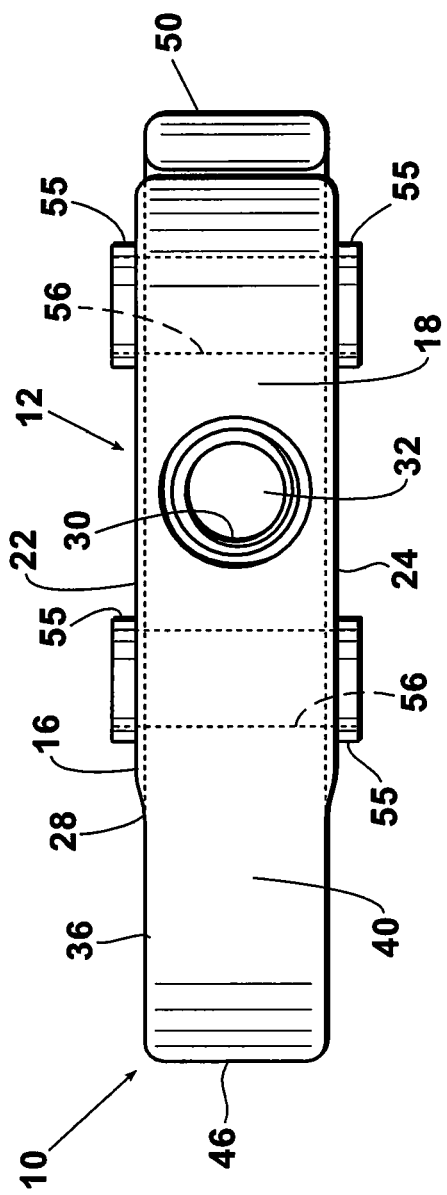

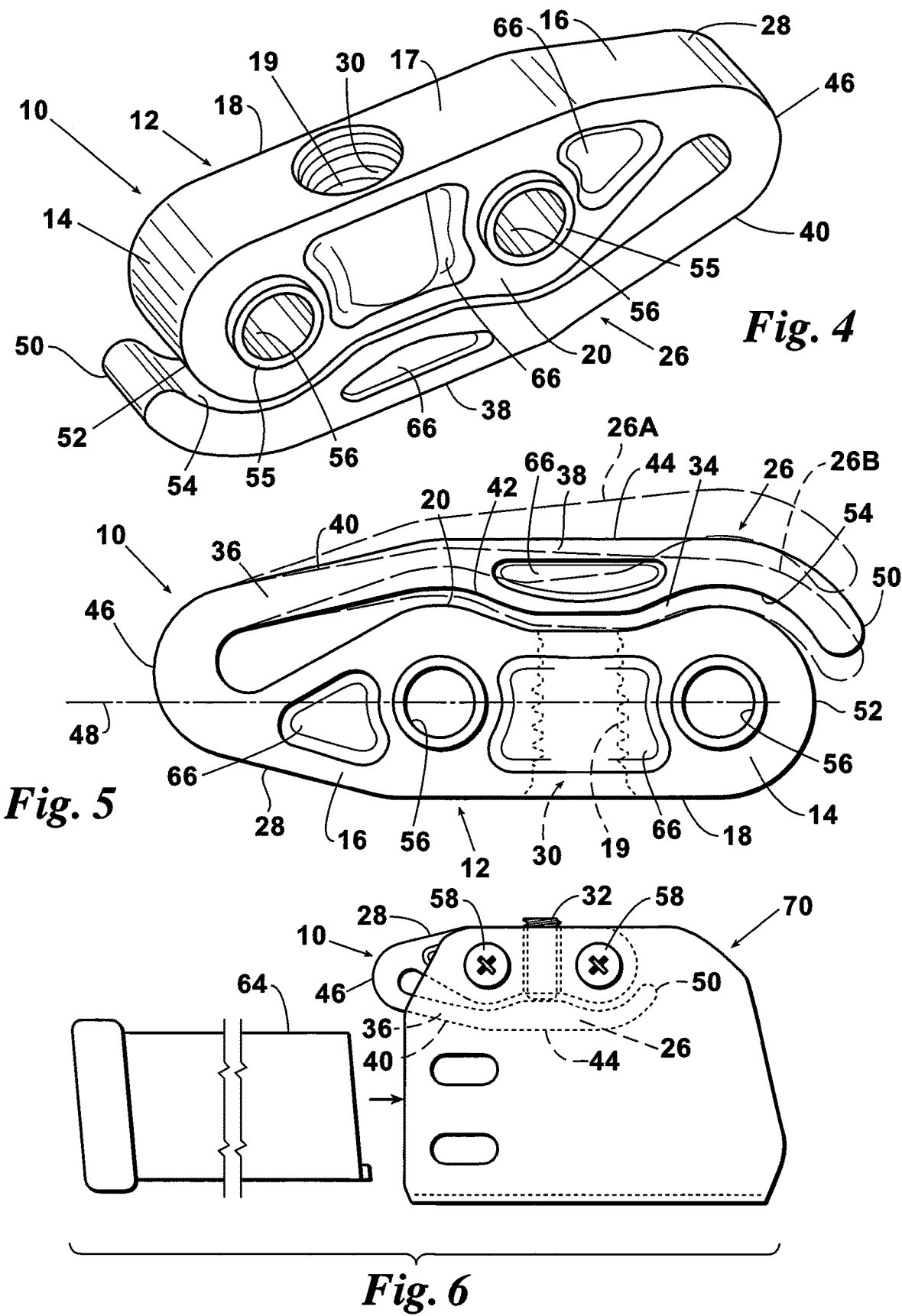

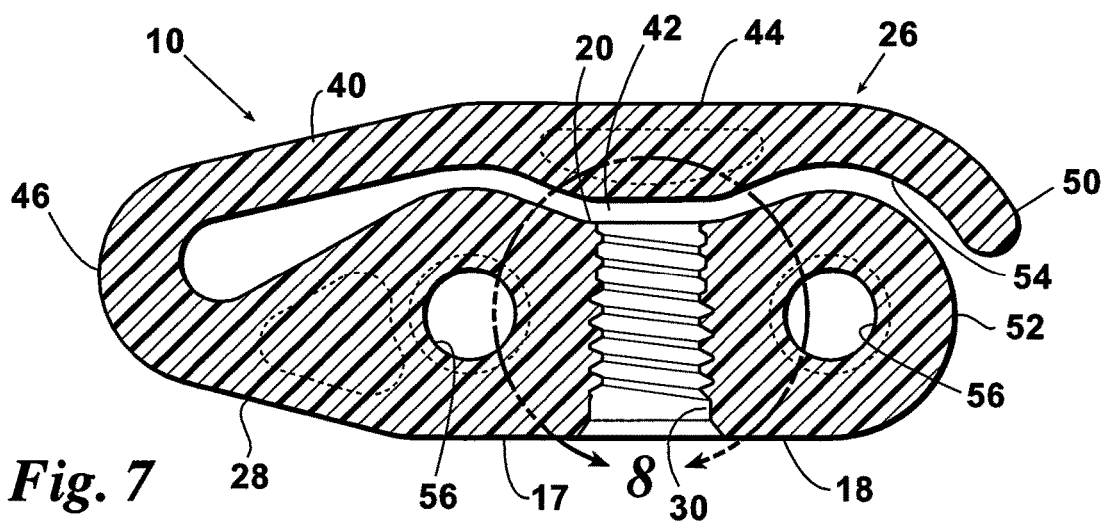
Fig. 7
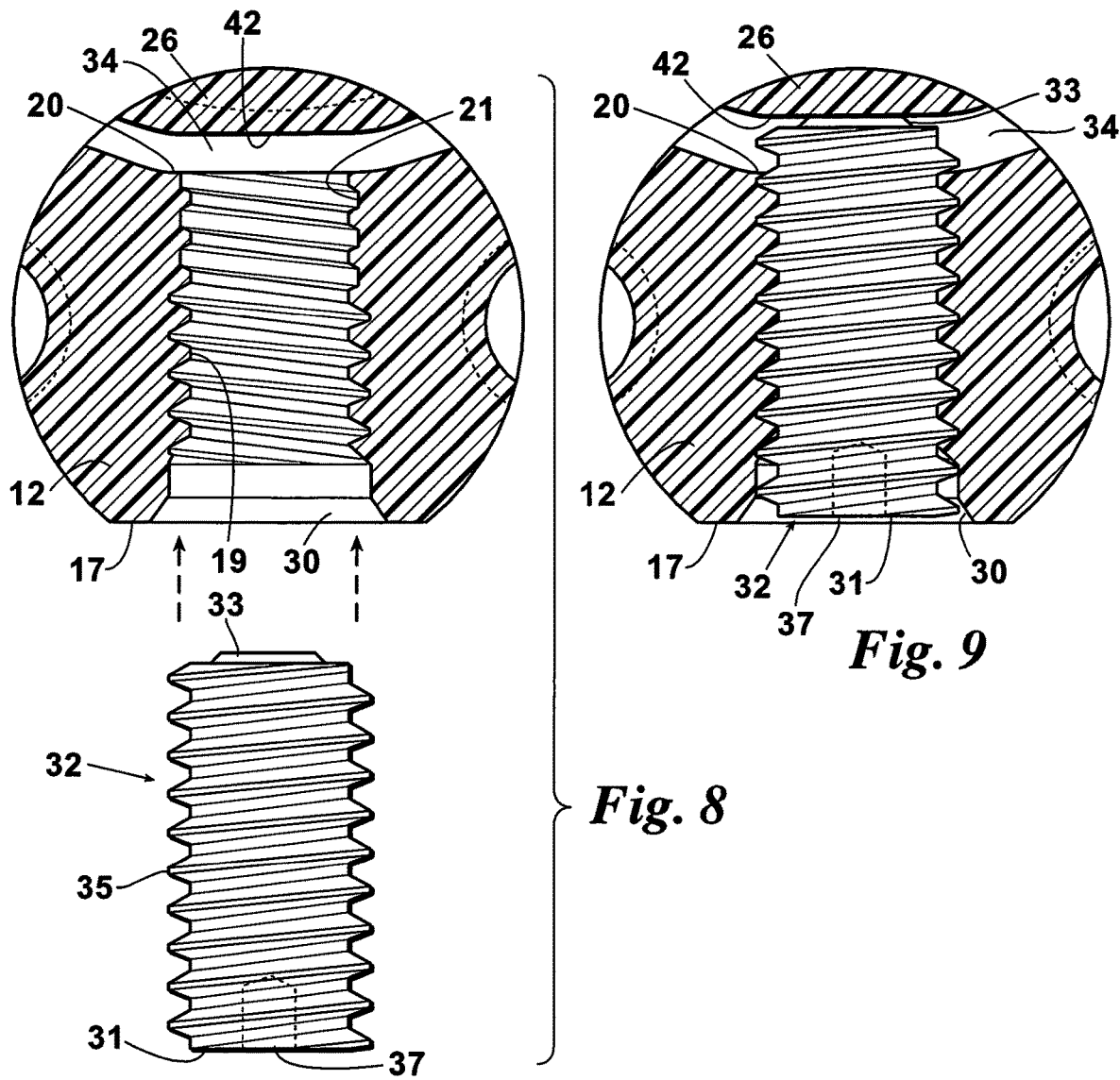
Fig. 8
Fig. 9

RETENTION CLIP

CROSS REFERENCE TO RELATED APPLICATION

This application claims the benefit of U.S. Provisional Application No. 62/544,668 filed Aug. 11, 2017, herein incorporated by reference in its entirety for all purposes.

FIELD OF THE INVENTION

The present invention relates to clips used to retain/secure an object in a case/carrier. More particularly, the present invention relates to clips used for retaining an accessory such as a spare firearm magazine in a (magazine) carrier.

BACKGROUND

Carriers for the purpose of retaining an accessory so as to be carried on a person who does not want to carry the accessory by hand or in a pocket are known and available commercially, particularly in the law enforcement, shooting sports, and personal protection industries. Such carriers can be used whenever it is desirable to carry any accessory on one's person, typically attached or clipped to a belt. Such accessories may include, without limitation, a spare firearm magazine, a flashlight, knife, multitool, tape measure, or tool of any kind.

A known problem, however, with such accessory carriers is that the accessory often does not fit perfectly, or even satisfactorily, in the carrier and may fall out or risk falling out and becoming lost or be so loose as to become a distraction to the user. However, even if the problem is not that extreme, or even if the carrier is made and sold to fit a specialized accessory, users each have personal preferences and comfort levels with the accessories they carry on their person.

One known problem encountered is that accessories manufactured by different manufacturers, although similar, often have small differences in size and/or shape which adversely affect the fit of that accessory in a carrier. These small differences frequently make it very difficult for a manufacturer to produce a single carrier suitable for use with all such products. By way of non-limiting example, in the law enforcement, shooting sport, and personal protection industries, manufacturers of accessory carriers where the accessory is a flashlight, it is known that tactical flashlights may be similarly sized but vary slightly in diameter and/or shape. In the case of a spare handgun magazine, even for a particular chosen caliber, many small variations exist in size and shape of those magazines between the various handgun manufacturers and after-market accessory providers. The carrier manufacturer must provide specific carriers by caliber but also by manufacturer. The alternative is to provide a single design and run the risk of dissatisfied customers due to ill-fitting carriers. A need, therefore, exists for a device which is adjustable to account for different types, manufacturers, and sizes of accessories.

One known approach at solving this problem is to provide a carrier which is capable of constricting, or squeezing, the sides of the accessory. One problem with this approach is that a goal of accessory carrier designs is to be as lightweight and low profile as possible. This often results in a carrier which has a thin, shallow shell such that when the accessory is actually inserted, the constricting force is actually applied only to a small area of the accessory body. Moreover, the side walls of accessories are often tapered, thereby defeating the constriction effort. A need, therefore exists for a design which does not rely on constricting the sides of the accessory.

There are at least two primary factors that contribute to an accessory carrier design, retention and drag. Retention relates to the amount of force applied by the carrier upon the accessory in order to retain the accessory securely in the carrier, taking into account such factors as positioning of the carrier on the person of the user and the level of physical activity of the user.

Drag, in contrast, relates to the amount of effort/force which must be exerted by the user in order to insert and remove the accessory from the carrier. The optimal amount of drag has been found to be, in many cases, a function of personal preference.

The side constriction solution described above commonly must make trade-offs between retention and drag. If, as described, the carrier is designed to be low profile such that only a short length of the accessory is actually constricted, drag may be satisfactory but at the expense of retention. Conversely, designing a carrier which constricts a longer length of the accessory may satisfy the user's retention requirements but a the expense of drag. Such a construction commonly results in a situation where the amount of effort required to insert and then remove that length of accessory is often unacceptable to the user. A need, therefore, also exists for an accessory carrier design which satisfies both the retention and drag requirements of the user.

Other problems encountered with accessory carrier designs include the fact that wear from use and particularly resulting from repeated insertion and removal of the accessory from the carrier causes the carrier to wear and loosen over time. This can be a problem for carriers which are even specifically designed and sold for use with a specific accessory.

Changes in environmental conditions may also cause the accessory to become too tight or loose in the carrier on any given day. A need exists for a carrier that is capable of adjustment to account for such wear and environmental changes.

SUMMARY

The present disclosure describes a retainer clip particularly suited for implementation into an accessory carrier. The present retainer clip is designed to apply retention and drag force upon the back or upon a surface of an accessory rather than squeezing or constricting the entire accessory body within the carrier. The retainer clip may be implemented in a wide variety of applications and carriers whether to retain a substantially rectangular magazine or a round circumference of a flashlight. The result being a retention clip implemented into a single carrier providing a method for satisfactory retention and drag forces which compensates for differences in accessory size or shape. The retainer clip of the present disclosure further provides for adjustments to compensate for factors such as wear, environmental conditions, and/or user preferences.

The retainer clip of the present disclosure includes a body having a first end, second end, top, bottom, first side and second side. An arm extends from the body at a junction on the second end of the body. The arm is folded so as to extend along the bottom of the body such that the arm is spaced from the body. The body including an aperture extending through the body from the top to the bottom of the body. A stop pin is positioned in the aperture and is capable of extending in the space between the bottom of the body and the arm.

The arm further includes a shoulder segment and a longitudinal segment. The arm also includes an inner surface and an outer surface. The outer surface of the arm includes a shoulder surface along the shoulder segment. This shoulder surface helps in guiding an object, such as a magazine into a mag carrier to which the retainer clip is secured.

The arm includes a curved segment between the junction and the shoulder segment. The body includes a longitudinal axis. The shoulder segment of the arm is angled away from the longitudinal axis of the body between the curved segment of the arm and the longitudinal segment of the arm. The retainer clip of claim 7 wherein the longitudinal segment of the arm includes a longitudinal axis such that the longitudinal axis of the longitudinal segment of the arm is substantially parallel to the longitudinal axis of the body.

The arm further includes a distal segment. The first end of the body includes a curved surface in a plane perpendicular to the longitudinal axis of the body. The distal segment of the arm extends over at least a portion of the first end of the body. The distal end of the arm includes a curve which substantially mates the curve of the first end of the body.

The bottom surface of the body may include a sinusoidal geometry. The inner surface of the arm may include a sinusoidal geometry which is reverse of the sinusoidal geometry of the bottom of the body such that the reverse sinusoidal geometry of the inner surface of the arm substantially matches but is spaced from the sinusoidal geometry of the bottom of the body.

The aperture in the body is annular, has a length and a diameter. The length of the aperture is preferably threaded. The stop pin is substantially cylindrical and includes a threaded external surface such that the stop pin threads into the aperture. The diameter of the aperture adjacent the bottom surface of the body is smaller than the diameter of the aperture adjacent the top surface of the body such that the smaller diameter acts as a lock washer for the stop pin to retain the stop pin in the aperture.

The body may include at least one aperture extending between the first side and the second side. The aperture is preferably used to secure the retainer clip to a device such as a magazine carrier.

The aperture is capable of receiving a retainer means therethrough. The retainer means may be any suitable fastener such as a screw bolt and nut or the like.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

FIG. 1 is an inverted side view of the retainer clip of the present disclosure.

FIG. 2 is a top plan view of the retainer clip of the present disclosure.

FIG. 3 is a first end view of the retainer clip of the present invention.

FIG. 4 is an isometric view of the retainer clip of the present disclosure.

FIG. 5 is the side view of FIG. 1 wherein the flexion of the arm in relation to the retainer clip body in response to a force exerted by the pin is exemplified.

FIG. 6 is a first side view of an exemplary magazine carrier including the retainer clip of the present disclosure.

FIG. 7 is a view taken along line 7-7 of FIG. 3 so as to expose a side view of the aperture in the body.

FIG. 8 is an enlarged view of detail 8 of FIG. 7 shown with an exemplary set screw capable of being threaded into the aperture.

FIG. 9 is the view of detail 8 of FIGS. 7 and 8 showing the exemplary set screw threaded through the aperture so as to contact the arm.

DETAILED DESCRIPTION OF THE PREFERRED EMBODIMENTS

Figure 10:
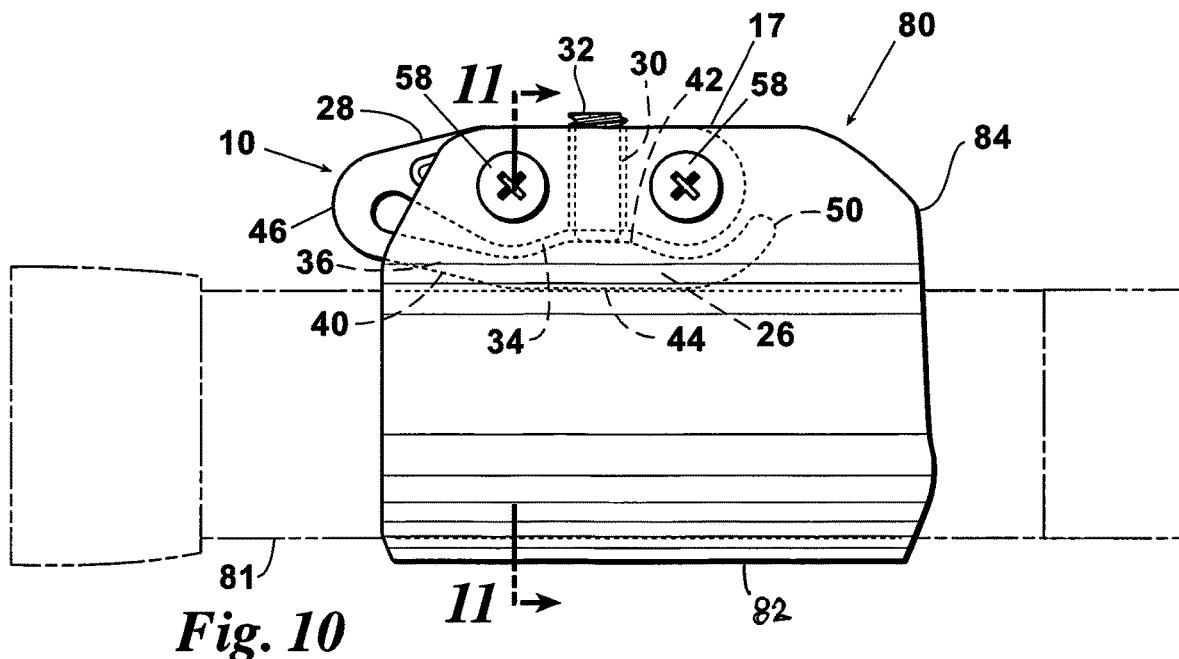
FIG. 10 is a side view of an exemplary flashlight carrier including the retainer clip of the present disclosure fixed thereon and further depicting the retainer clip wherein an exemplary flashlight is depicted in phantom retained in said exemplary flashlight carrier.

With reference to the figures wherein the reference numerals are consistent throughout, the retainer clip 10 of the present disclosure includes a body 12 having a first end 14, second end 16, top 18, bottom 20, first side 22 and second side 24. First side 22 and second side 24 are substantially identical in a preferred embodiment. Retainer clip 10 is preferably molded (most preferably injection molded) as a single unit and preferably of plastic (such as polyamide 66 or acrylonitrile butadiene styrene, for example) so as to be capable of repeated flexion. It should be understood, however, that clip 10 could be manufactured of several pieces and joined together and/or manufactured of other materials.

With specific reference to FIGS. 1-5, an arm 26 extends from body 12 at a junction on the second end 16 of body 12. Arm 26 is folded so as to extend along bottom 20 of body 12 such that arm 26 is spaced from body 12 (FIGS. 1, 4, and 5) by a space 34. Body 12 includes an aperture 30 extending through body 12 from top 18 to bottom 20 of body 12. A stop pin 32 is positioned in aperture 30 and is capable of extending through the width of arm 26 in the space 34 between bottom 20 of body 12 and the arm 26.

Arm 26 further includes a shoulder segment 36 and a longitudinal segment 38. The arm also includes an inner surface 42 and an outer surface 44. Outer surface 44 of arm 26 includes a shoulder surface 40 along the shoulder segment 36. This shoulder surface 40 helps in guiding an object/accessory, such as a magazine into a mag carrier to which the retainer clip 10 is secured (FIG. 6). In a preferred embodiment, shoulder surface 40 is a flat surface angled with respect to the longitudinal axis of arm 26 or the longitudinal axis 48 of body 12 (in the range of 11° to 15°).

Arm 26 includes a curved segment 46 between junction 28 and shoulder segment 36. Curved segment 36 is flexible such that the longitudinal axis of arm 26 may be angled in a positive or negative direction with respect to the longitudinal axis 48 of body 12 (depicted in phantom 26A and 26B in FIG. 5). Body 12 includes a longitudinal axis 48. Shoulder segment 36 of arm 26 is angled away from longitudinal axis 48 of body 12 between curved segment 46 of arm 26 and longitudinal segment 38 of arm 26. Curved segment 46 allows longitudinal segment 38 of arm 26 to be folded back along body 12 as well as flexion of arm 26 in relation to body 12. Longitudinal segment 38 of arm 26 includes a longitudinal axis such that the longitudinal axis of longitudinal segment 38 of arm 26 is substantially parallel to the longitudinal axis 48 of body 12.

Figure 11:
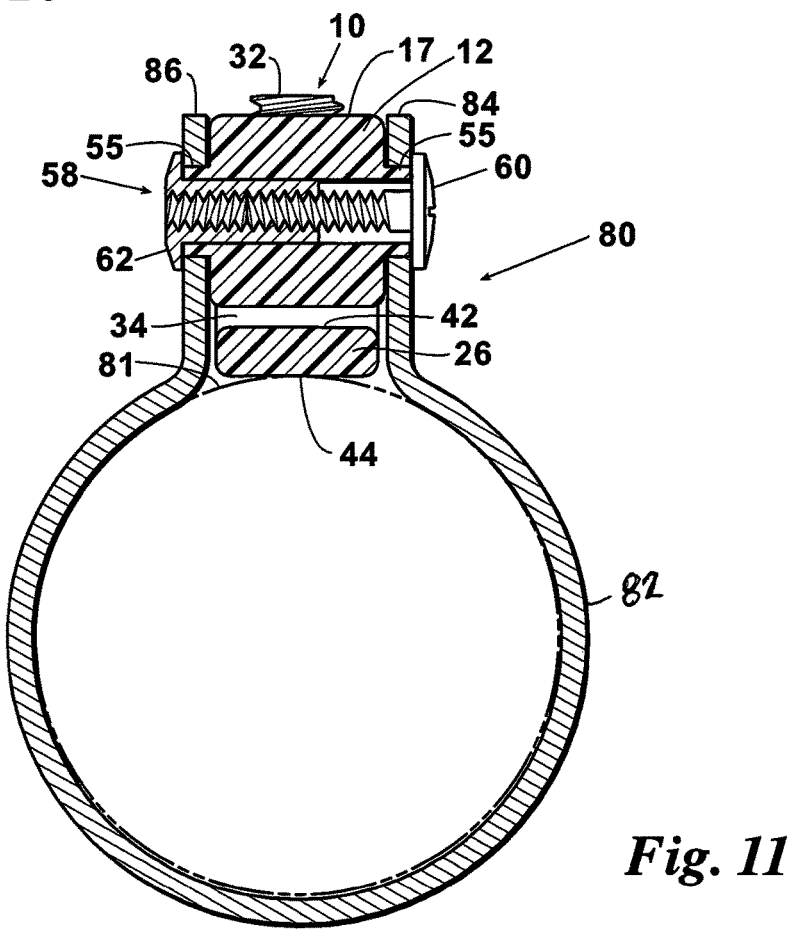
FIG. 11 is a partial cut-away view of the exemplary flashlight carrier of FIG. 10 including the retainer clip of the present disclosure depicting a second end view of the retainer clip.

Arm 26 further includes a distal segment 50. The first end 14 of body 12 includes a curved surface 52 in a plane perpendicular to the longitudinal axis 48 of body 12. Distal segment 50 of arm 26 extends over at least a portion of first end 14 of body 12. Distal segment 50 of arm 26 includes a curve 54 which substantially mates the curve 52 of first end 14 of body 12. Curve 54 acts to reduce the chance that distal segment 50 will snag on the accessory, such a magazine 64 (FIG. 6) or flashlight 81 (FIGS. 10 and 11) when the accessory is withdrawn from the carrier 80 (FIGS. 10 and 11).

Bottom surface 20 of body 12 may include a sinusoidal geometry in a preferred embodiment. The inner surface 42 of arm 26 may include a sinusoidal geometry which is the reverse (mate) of the sinusoidal geometry of the bottom surface 20 of body 12 such that the reverse sinusoidal geometry of the inner surface 42 of arm 26 substantially matches but is spaced from (by the width of space 34) the sinusoidal geometry of the bottom 20 of body 12. Additionally, arm 26 may be shaped or include added material where necessary to reinforce weak areas or areas of wear.

With specific reference to FIGS. 7-9, the aperture 30 in body 12 is annular in a preferred embodiment and has a length and a diameter. The cylindrical wall in body 12 which defines aperture 30 is preferably threaded. As an example and not limitation, ¼-20 thread pitch has been found to be acceptable. The cylindrical length of aperture 30 preferably includes threads 19. Stop pin 32 is substantially cylindrical and includes a threaded external surface such that stop pin 32 threads into aperture 30 (threads mate).

In a particularly preferred embodiment, the diameter of aperture 30 adjacent the bottom surface 20 of body 12 is smaller than the diameter of aperture 30 adjacent the top surface 18 of body 12. In this portion, threads 21 are not machined as deeply into body 12 as threads 19. In this way, once stop pin 32 is threaded into aperture 30, the threads 21 of the smaller diameter section act as a lock washer for stop pin 32 to retain the stop pin 32 in aperture 30. In other words, threads 35 of stop pin 32 cut into the walls of aperture 30 at threads 21 and into body 12 as stop pin 32 is threaded into aperture 30 This helps prevent stop pin 30 from becoming loose and backing out of aperture 30 over time.

In a preferred embodiment, stop pin 32 is a set screw with threads that mate the treads of aperture 30. Stop pin 32 includes a proximal end 31 and a distal end 33.

The amount of bias required for surface 44 of arm 26 to satisfactorily retain an accessory, such as a magazine (FIG. 6) or a flashlight (FIGS. 10 and 11) in a magazine holder or flashlight holder is adjustable by stop pin 32. Stop pin 32 is intended to be threaded through aperture 30 past bottom 20 of body 12 and into space 34.

Distal end 33 of stop pin 32 may extend into space 34 only part way such that arm 26 may be negatively biased such that surface 42 of arm 26 contacts distal end 33. This would happen when an accessory inserted into an accessory carrier (magazine carrier or flashlight carrier, for example) contacts surface 44 of arm 26 so as to bias arm 26 into space 34 so that surface 42 contacts distal end 33 of stop pin 32. This position is exemplified in phantom as 26B in FIG. 5.

In another embodiment, stop pin 32 may be threaded into space 34 such that distal end 33 contacts surface 42 of arm 26 and applies a neutral bias to arm 26. In this embodiment, arm 26 would flex very little, except perhaps at end 50, if desired. This position is exemplified as arm 26 is depicted in FIG. 5.

Alternatively, stop pin 32 may be threaded into aperture 30 such that distal end 33 contacts surface 42 so as to apply a positive bias to arm 26. In this way, arm 26 may be biased away from body 12 to increase the width of space 34. Surface 44 of arm 26 may thus apply a positive force against an accessory retained in an accessory holder. This position is exemplified as arm 26A depicted in FIG. 5.

Body 12 may include at least one slot 56 extending between first side 22 and second side 24 of body 12 (these are shown in FIG. 4). The slot 56 is preferably used to secure retainer clip 10 to an accessory carrier device such as a magazine carrier or a flashlight carrier (FIGS. 6, 10 and 11).

Slot(s) 56 may include respective tabs, collectively 55. Tabs 55 extend from slot 56 from first side 20 and second side 22. One purpose of tabs 55 shall be discussed further below.

Slots 56 are capable of receiving a retainer means 58 therethrough. The retainer means may be any suitable fastener such as a screw bolt and nut or the like. In a most preferred embodiment the retainer means 58 is a post end 60 and screw fastener 62 available commercially, however is not limited thereto.

Body 12 may also include indentions, collectively 66, positioned on first side 22 and/or second side 24. Indentions 66 are areas where a reduced amount of material is required, thus saving weight and material cost. These indentions 66 can be created during the injection molding process in a known manner. Indentions 66 could also represent areas for the placement of text or logos as desired.

Next with reference to FIG. 6, an embodiment wherein retainer clip 10 of the present disclosure is implemented in a firearm magazine carrier 70 shall next be described. As shown, retainer clip 10 is secured to magazine carrier 70 by way of screw and post fasteners 58 inserted through the slots. In this orientation, retainer clip 10 is positioned such that arm 26 extends below body 12 into the interior of magazine carrier 70. Stop pin 32 is adjusted such that it engages arm 26 as described above in a desired position. Magazine 64 may then be inserted into carrier 70 so that it first contacts and slides along surface 40 which acts to orient and properly direct magazine 64 into the interior of carrier 70. Magazine 64 then engages surface 44 which is adjusted, through stop pin 32 to exert the desired drag force along magazine 64 as it is inserted fully into carrier 70. Once fully inserted, stop pin 32 is, likewise adjusted to apply the desired retention force upon magazine 64 to satisfactorily retain magazine 64 inside magazine carrier 70. It should be noted that the drag and retention forces are applied by retainer clip 10 acting against magazine 84 as described and not as a result of application of a squeezing or constricting force around magazine 64.

Next, in association with FIGS. 10 and 11, an embodiment where retention clip 10 of the present disclosure is implemented into a flashlight carrier 80 shall next be described. As shown in FIG. 10, retainer clip 10 is secured to flashlight carrier 80 by way of screw and post fasteners 58 inserted through the slots (as described below). In this orientation, retainer clip 10 is positioned such that arm 26 extends below body 12 into the interior of flashlight carrier 80. Stop pin 32 is adjusted such that it engages arm 26 as described above in a desired position. Flashlight 81 may then be inserted into carrier 80 so that it first contacts and slides along surface 40 of arm 26 which acts to orient and properly direct flashlight 81 into the interior of carrier 80. Flashlight 81 then engages surface 44 of arm 26 which is adjusted, through stop pin 32 to exert the desired drag force applied along the body of flashlight 81 as it is inserted fully into carrier 80. Once fully inserted, stop pin 32 is, likewise adjusted to apply the desired retention force upon flashlight 81 to satisfactorily retain flashlight 81 inside flashlight carrier 80. It should be noted that the drag and retention forces are applied by retainer clip 10 acting against the body of flashlight 81 as described and not as a result of application of a squeezing or constricting force around the circumference of flashlight 81.

FIG. 11 is a partial cross-sectional view taken along line 11-11 of FIG. 10. Flashlight carrier 80 including retention clip 10 of the preset disclosure embodied therein, includes an annular shell 82 (in cross-section) with wings 84 and 86 extending therefrom. Retention clip 10 of the present disclosure is oriented and secured between wings 84 and 86 by retainers 58.

Wings 84 and 86 each include holes drilled therein of a diameter to allow tabs 55 extending from body 12 to extend therethrough. Retainer 58, in this embodiment, is comprised of a pin 62 and screw 60 fastening system. Such pin and screw fasteners are known and are available commercially. Retainer 58 is tightened so as to secure retainer clip 10 between wings 84 and 86. Accordingly, a method of retaining an accessory in a carrier using the retention clip 10 of the present disclosure is thus described.

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Exemplary mag carrier and flashlight carrier are depicted and discussed herein. It should be understood that other accessory carriers or any application wherein a retainer clip with end bias capability are required/desired are contemplated. Accordingly, the examples should not be construed as limiting the scope of the claimed invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A retainer clip comprising:
    a body having a first end, second end, top, bottom, first side and second side;
    an arm extending from said body at a junction on said second end;
    said arm folded so as to extend along said bottom of said body such that said arm is spaced from said body;
    said arm including a distal segment which is not connected to or inserted into said body;
    said body including an aperture extending through said body from said top to said bottom;
    a stop pin positioned in said aperture and capable of extending in said space between said bottom of said body and said arm.

2. The retainer clip of claim 1 wherein said body is constructed as a single unit.

3. The retainer clip of claim 1 wherein said arm includes a shoulder segment and a longitudinal segment.

4. The retainer clip of claim 3 wherein said arm further includes an inner surface and an outer surface.

5. The retainer clip of claim 4 wherein said outer surface of said arm includes a shoulder surface along said shoulder segment.

6. The retainer clip of claim 3 wherein said arm includes a curved segment between said junction and said shoulder segment.

7. The retainer clip of claim 6 wherein said body includes a longitudinal axis and said shoulder segment of said arm is angled away from said longitudinal axis of said body between said curved segment of said arm and said longitudinal segment of said arm.

8. The retainer clip of claim 7 wherein said longitudinal segment of said arm includes a longitudinal axis such that said longitudinal axis of said longitudinal segment of said arm is substantially parallel to said longitudinal axis of said body.

9. The retainer clip of claim 8 wherein said first end of said body includes a curved surface in a plane perpendicular to said longitudinal axis of said body.

10. The retainer clip of claim 9 wherein said distal end of said arm extends over at least a portion of said first end of said body.

11. The retainer clip of claim 10 wherein the distal end of said arm includes a curve which substantially mates the curve of said first end of said body.

12. The retainer clip of claim 11 wherein said bottom surface of said body includes a substantially sinusoidal geometry.

13. The retainer clip of claim 12 wherein said inner surface of said arm includes a reverse sinusoidal geometry of said bottom of said body such that said reverse sinusoidal geometry of said inner surface of said arm substantially matches but is spaced from the sinusoidal geometry of said bottom of said body;
    said longitudinal segment and said shoulder segment each having a length and a thickness;
    the reverse sinusoidal geometry of said inner surface of said arm having a length;
    the length of said reverse sinusoidal geometry of said inner surface of said arm being substantially equal to the length of said longitudinal segment;
    said thickness of said longitudinal segment of said arm being greater than said thickness of said shoulder segment.

14. The retainer clip of claim 1 wherein said aperture is annular, has a length and a diameter.

15. The retainer clip of claim 14 wherein said length of said aperture is threaded and includes a longitudinal axis;
    said longitudinal segment of said arm including a longitudinal axis;
    said longitudinal axis of said aperture being substantially perpendicular to said longitudinal axis of said longitudinal segment.

16. The retainer clip of claim 15 wherein said stop pin is substantially cylindrical and includes a threaded external surface such that said stop pin threads into said aperture.

17. The retainer clip of claim 16 wherein said diameter of said aperture adjacent said bottom surface of said body is smaller than said diameter of said aperture adjacent said top surface of said body such that said smaller diameter acts as a lock washer to said stop pin.

18. The retainer clip of claim 1 wherein said body includes at least one aperture extending between said first side and said second side;
    said aperture configured to receive a retainer means therethrough.

19. The retainer clip of claim 18 wherein said at least one aperture includes a tab thereon.

* * * * *